United States Patent

Ohta et al.

[11] Patent Number: 5,815,819
[45] Date of Patent: Sep. 29, 1998

[54] INTERMITTENT RECEPTION CONTROL APPARATUS

[75] Inventors: Hiroyuki Ohta, Kariya; Hiroaki Shibata, Nagoya; Akio Kosaka, Chiryu, all of Japan

[73] Assignee: Nippondenso Co., Ltd., Kariya, Japan

[21] Appl. No.: 672,552

[22] Filed: Jun. 28, 1996

[30] Foreign Application Priority Data

Jun. 30, 1995 [JP] Japan .................................. 7-165629

[51] Int. Cl.$^6$ .............................. H04B 1/38; H04M 1/00
[52] U.S. Cl. ........................ 455/574; 455/343; 455/38.3
[58] Field of Search .................................. 455/54.1, 38.3, 455/343, 574; 370/311

[56] References Cited

U.S. PATENT DOCUMENTS

| 5,283,568 | 2/1994 | Asai et al. ........................ 340/825.44 |
| 5,628,001 | 5/1997 | Cepuran et al. ........................ 395/556 |

FOREIGN PATENT DOCUMENTS

| 60-250736 | 12/1985 | Japan . |
| 2-309833 | 12/1990 | Japan . |

*Primary Examiner*—Andrew I. Faile
*Assistant Examiner*—Christopher Onuaku
*Attorney, Agent, or Firm*—Cushman Darby & Cushman IP Group of Pillsbury Madison & Sutro LLP

[57] ABSTRACT

An intermittent reception waiting time period is roughly counted by counting low frequency clocks using a low frequency clock counter and a remainder of the intermittent reception waiting time period which cannot be counted with a time resolution of the low frequency clocks is counted by counting high frequency clock pulses using a high frequency clock counter with a high time resolution. Outputs of the high frequency clocks are prohibited while the intermittent reception waiting time period is counted by the low frequency clock counter. As a result, accurate start timing of an intermittent reception can be set with reduced power consumption caused by prohibiting the outputs of the high frequency clock pulses.

15 Claims, 3 Drawing Sheets

INTERMITTENT RECEPTION CONTROL APPARATUS

BACKGROUND OF THE INVENTION

1. Field of the Invention

The present invention relates to an intermittent reception control apparatus which is provided in a reception unit for intermittently receiving transmission data transmitted from a base station on a periodic basis and is intended to set an intermittent reception start timing.

2. Description of the Related Art

Conventionally, there is known a time-divisional radio communication system which is constructed such that when performing radio communication, for example, between a base station and a plurality of local stations, transmission of data is time-divisionally performed from the base station to the local stations and, on the side of each local station, only data transmitted with respect thereto is received and demodulated (refer to JP-A-60-250736).

Furthermore, there is also known an arrangement which is so constructed as to perform a so-called "intermittent reception" wherein since on the side of each local station constituting the above-mentioned time-divisional radio communication system there is no need to receive transmission data from the base station at all times, after reception of data transmitted therefrom the receiving operation is stopped once and then is re-started with a timing at which the base station next performs data transmission with respect to the local station.

In a case where on the local station intermittent reception is performed, when the local station is in a waiting state wherein no reception is performed, the receiving operation of the reception unit can be stopped. Therefore, in a system wherein the local station is driven by a battery, it is possible to decrease the amount of power consumption to thereby effectively utilize the battery power.

On the other hand, in order to perform the above-mentioned intermittent reception, it is necessary to count a time period which after once stopping, the receiving operation lapses until the receiving operation is next started. For this reason, a reception unit for performing intermittent reception is provided with an intermittent reception control apparatus which is usually provided with an oscillator for generating output clock pulses and a counter for counting the output clock pulses from this oscillator, whereby when the counted value of the counter has reached a predetermined value, the system determines that a predetermined reception waiting time period has lapsed, thereby re-starting the performance of the receiving operation by the reception unit.

In a case where a start timing for starting intermittent reception is set using the above-mentioned intermittent reception control apparatus, if a high frequency oscillator for generating a clock signal in a cyclic period shorter than a transmission cyclic period in which transmission data is transmitted from the base station is used as an oscillator for generating the counting clock pulses, the start timing for starting intermittent reception can be exactly synchronized with a transmission start timing for starting transmission from the base station to the local station.

However, since current consumption of the high frequency oscillator is large, there is the problem that use of the high frequency oscillator as an oscillator for generating time counting clock pulses results in the fact that despite the stop of the receiving operation of the reception unit, current consumption during a reception waiting time becomes large, whereby power consumption of the local station cannot be sufficiently decreased.

Meanwhile, in order to solve the above problem, it is sufficient to use a low frequency oscillator small in current consumption as the oscillator source for generating time counting clock pulses. However, in this case, it is not possible to accurately pick up the intermittent reception start timing by using output clock pulses from the low frequency oscillator. Therefore, as illustrated in FIG. 5, it is necessary to provide a reception timing pick-up time period by setting a reception start timing A earlier than a transmission start timing R at which the base station starts transmission of data with respect to the local station and, during this pick-up time period, to synchronize the transmission timing of the base station with the reception timing of the local station. That is, FIG. 5 illustrates a case where a base station performs sequential time-divisional transmission of 4-bit data with respect to each of a plurality of local stations in predetermined transmission cyclic periods and a reception unit on a local station performs the intermittent reception of 4-bit data transmitted to the local station. In order to set an intermittent reception start timing by using output clock pulses from a low frequency oscillator oscillating in a cyclic period longer than the transmission cyclic period of each one bit of the data, since it is impossible to accurately pick up a timing R at which intermittent reception is to be started by using only the output clock pulse from the low frequency oscillator, measures must be taken to detect a reception start timing A earlier than the timing R using output clock pulses from the low frequency oscillator to thereby start the receiving operation, to take synchronization during a time period of from this timing A to the timing R at which intermittent reception is actually to be started between data transmission timing on a transmission unit side and reception timing on the local station according to transmission signals from the base station, and to reset intermittent reception start timing so that intermittent reception can be started with the timing R at which data is transmitted from the base station to the local station.

Since the reception timing pick-up time period of from the reception start timing A to the timing R at which intermittent reception is actually to be started corresponds to a synchronization pick-up time period of receiving clock pulses generating PLL on the local station, a time period that corresponds to transmission data of several tens of bits from the base station usually becomes needed as the reception timing pick-up time period, with the result that the reception waiting time period on the local station becomes shortened. In consequence, there is the problem that the effect of decrease in the power consumption due to intermittent reception cannot be brought about sufficiently.

SUMMARY OF THE INVENTION

The present invention has been made in view of the above problem, and an object of the present invention is to provide an intermittent reception control apparatus in which a reception unit for performing intermittent reception enables accurate setting of the intermittent reception start timing without large current consumption.

In an intermittent reception control apparatus according to a first aspect of the present invention, there are provided two kinds of oscillators, one of which is a high frequency oscillator oscillating in a cyclic period shorter than a transmission cyclic period for one data bit on a base station and the other of which is a low frequency oscillator oscillating in a cyclic period longer than the transmission cyclic period, and an edge detector which detects a rising or falling edge of low frequency clock pulses outputted from the low frequency oscillator.

A first high frequency clock counter counts the number of high frequency clock pulses outputted from the high frequency oscillator during a time period of from a time when a reception unit provided with the intermittent reception control apparatus has been brought to a state of waiting for transmission data from the base station to a time when an initial edge has been detected by the edge detector. Then, when the initial edge has been detected by the edge detector, a low frequency clock counter starts to count the number of the low frequency clock pulses, and it generates a timing signal when the counted number of the low frequency clock pulses has reached a predetermined number set beforehand. Also, during a predetermined time period in which the low frequency clock counter is counting the low frequency clock pulses as mentioned above, the high frequency oscillator is prevented from oscillating.

When the timing signal is outputted from the low frequency clock counter, a second high frequency clock counter counts the number of the high frequency clock pulses and, when it has reached a predetermined number based on the number of the high frequency clock pulses counted by the first high frequency clock counter and a preset number of clock pulses, an intermittent reception start timing signal is generated.

Namely, according to the intermittent reception control apparatus according to this aspect of the present invention, the reception waiting time period of from a time when the reception unit has been brought to the state of its waiting for transmission data to the time when the reception unit re-starts to receive transmission data is roughly counted by counting the low frequency clock pulses from the low frequency oscillator by the low frequency clock counter and the remaining time period which cannot be counted with a time resolution of the low frequency clock pulses is counted with a high time resolution of the high frequency clock pulses from the high frequency oscillator by the first and second high frequency clock counters. Therefore, accurate setting of the reception waiting time period and the intermittent reception start timing is possible. In addition, by stopping the oscillating operation of the high frequency oscillator during the predetermined time period in which the low frequency clock counter is performing its counting operation and there is no need to use high frequency clock pulses, performance of the oscillating operation of the high frequency oscillator during the time period in which the reception unit is in a state of waiting for transmission data is minimized. Therefore, an increase in the current consumption caused by the operation of the high frequency oscillator is minimized.

According to this aspect of the present invention, it is possible to accurately set the intermittent reception start timing without providing the reception timing pick-up time period as in the case of a unit adapted to set an intermittent reception start timing by using only a low frequency oscillator alone. In addition, it is possible to reduce current consumption caused by the oscillation of the high frequency oscillator compared to a case where intermittent reception start timing is set by using only a high frequency oscillator alone.

Therefore, according to this aspect of the present invention, current consumption can be reduced drastically during the time the reception unit for performing intermittent reception is in a state of waiting for reception, and power consumption can be reduced compared to the prior art reception units. Particularly, when the present invention is applied to a reception unit in a communication apparatus which is driven by a battery as in the case of a portable telephone or car telephone, power consumption of the battery can be reduced and a continuous effective use time period of the battery can be prolonged.

According to another aspect of the present invention, a second high frequency clock counter delays for a predetermined time period a timing signal from a low frequency clock counter by use of a delay circuit and starts to count high frequency clock pulses according to the delayed timing signal. Then, when an initial edge is detected, oscillation of a high frequency oscillator is inhibited until a timing signal is outputted from the low frequency clock counter.

Since current consumption is reduced by stopping oscillation of the high frequency oscillator during a predetermined time period, it is sufficient to achieve reduction of current consumption if the oscillating operation of the high frequency oscillator is inhibited during a time period of from a time when the initial edge is detected to a time when the low frequency clock counter outputs the timing signal. In that case, however, if the timing at which the second high frequency clock counter starts counting of the high frequency clock pulses synchronizes with the timing at which the high frequency oscillator re-starts its oscillating operation, it becomes impossible to perform accurately lapsed-time counting by use of the second high frequency clock counter because the high frequency clock pulses immediately after starting of the counting operation of the second high frequency clock counter are unstable.

Therefore, in the present invention, by providing a time delay between generation of a timing signal from the low frequency clock counter and start of counting of the high frequency clock pulses by the second high frequency clock counter, the lapsed time can be accurately counted even when the oscillating operation of the high frequency oscillator starts according to the timing signal from the low frequency clock counter because the high frequency clock pulses from the high frequency oscillator are stable when the second high frequency clock counter starts counting.

According to this aspect of the present invention, it is unnecessary, in order to ensure the time counting accuracy, to monitor the counting operation of the low frequency clock counter to re-start of the oscillation of the high frequency oscillator prior to completion of the counting operation of the low frequency clock counter. Therefore, it becomes possible to set the intermittent reception start timing accurately without decline of accuracy of the second high frequency clock counter.

DETAILED DESCRIPTION OF THE PREFERRED EMBODIMENT

An embodiment of the present invention will now be explained with reference to the drawings.

Figure 2:
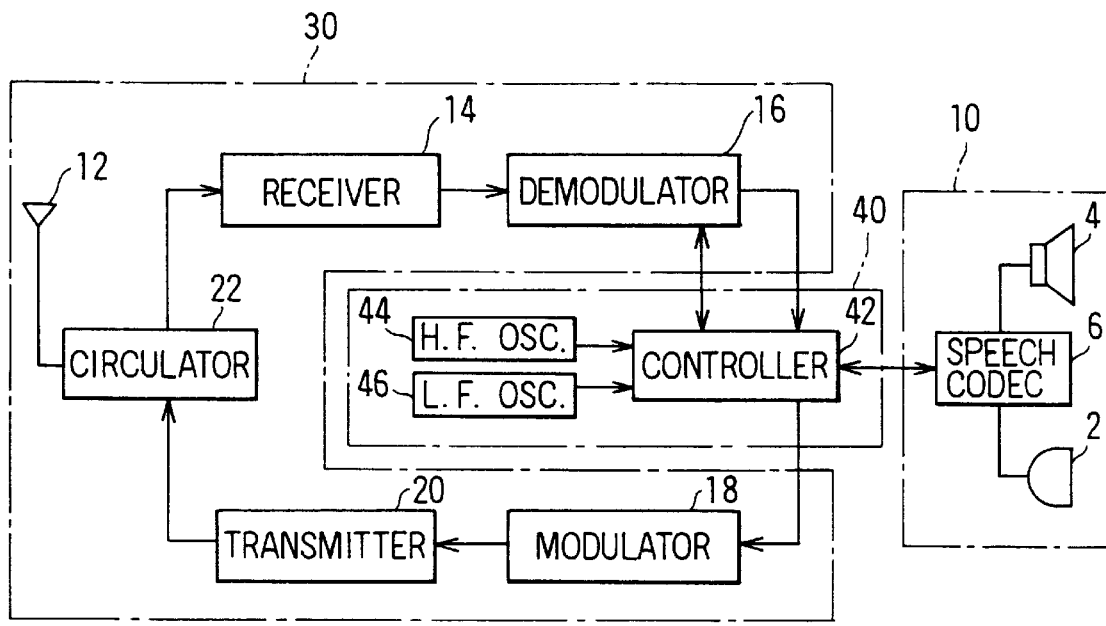
FIG. 2 is a block diagram showing an entire construction of a portable telephone according to the embodiment.

FIG. 2 is a block diagram showing an entire construction of a portable type telephone apparatus (portable telephone) according to an embodiment to which the present invention has been applied. Note that the portable telephone is of a known type wherein a plurality of local stations are grouped and each of the grouped local stations receives transmission data from a base station that transmits certain data time-divisionally in group units and, as necessary, performs transmission and reception of telephone talk data between itself and another telephone apparatus by way of the base station and a telephone line network to which the base station is connected.

As shown in FIG. 2, the portable telephone apparatus according to this embodiment comprises a telephone talk unit 10, communication unit 30, and control unit 40. The telephone talk unit 10 comprises a microphone 2 for inputting a voice, a received voice reproduction speaker 4, and a speech codec 6 for converting an analog voice signal inputted from the microphone 2 to a digital voice signal and converting a digital voice signal transmitted over from a calling source to an analog voice signal and outputting this analog voice signal to the speaker 4. The communication unit 30 comprises a communication antenna 12 for performing radio communication between itself and the base station, a high frequency receiver 14 for amplifying a received signal that is received by the communication antenna 12 and converting it to an intermediate frequency signal, a demodulator 16 for demodulating the converted intermediate frequency signal converted by the high frequency receiver 14, a modulator 18 for modulating a transmission signal according to transmission data, a high frequency transmitter 20 for converting the modulated transmission signal by the modulator 18 to a communication high frequency signal and outputting it in amplified form, and a transmission/reception circulator 22 for outputting the received signal from the communication antenna 12 to the high frequency receiver 14 and outputting the high frequency signal from the high frequency transmitter 20 to the communication antenna 12. The control unit 40 is intended to perform transmission and reception of telephone talk voice data between itself and the telephone talk unit 10 and also to control the transmitting/receiving operations of the communication unit 30.

Figure 3:
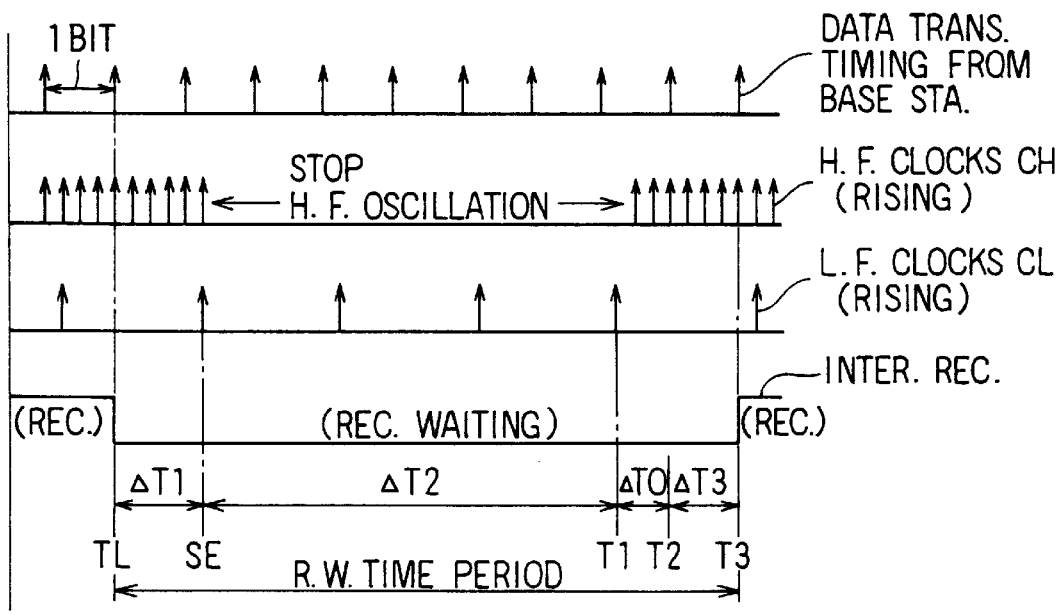
FIG. 3 is a timing diagram illustrating the operation of the reception start timing setting circuit according to the embodiment.

Also, the control unit 40 is intended to execute various kinds of controls such as those illustrated under the items (1) to (4) which follow, in order to achieve the function to be performed as a portable telephone. Accordingly, it comprises a controller 42 that is constructed using a CPU as a main component in order to execute such various kinds of controls, a high frequency oscillator 44 that, as illustrated in FIG. 3, oscillates in a cyclic period shorter than the transmission cyclic period per one bit of data transmitted from the base station and outputs high frequency clock pulses CH corresponding to the oscillation cyclic period of the high frequency oscillator, and a low frequency oscillator 46 that, as illustrated in FIG. 3, oscillates in a cyclic period longer than the transmission cyclic period and outputs low frequency clock pulses CL corresponding to the oscillation cyclic period of the low frequency oscillator. Current consumption of the low frequency oscillator is smaller than that of the high frequency oscillator 44.

The control unit 40 executes operations such as:

(1) Reception timing control of, in order to demodulate transmission data from the base station in the demodulator 16, generating a reception timing signal synchronized with the transmission cyclic period per one-bit of data on the base station and outputting it to the demodulator 16.

(2) Intermittent reception control to intermittently execute the receiving operation on the side of the communication unit 30 by executing production and outputting of the reception timing signal during only a transmission period in which the base station performs data transmission to the portable telephone and of stopping production and outputting of the reception timing signal during periods other than the transmission period.

(3) Telephone line connection control to connect its own telephone line with that of another telephone via a switchboard or the like provided in the base station and a telephone line network by detecting a calling signal to the portable telephone from among received data demodulated by the demodulator 16 and outputting to the modulator 18 transmission data for transmitting a response signal to the base station or outputting to the modulator 18 transmission data for transmitting a calling signal for calling on another telephone to the base station according to a telephone number having been inputted from an operation unit.

(4) Voice inputting/outputting control to achieve telephone communication between the portable telephone and another telephone apparatus, after connection of the telephone lines, by extracting from among the received data from the demodulator 16 a digital voice signal from another telephone apparatus and outputting this digital voice signal to the speech codec 6 and outputting to the modulator 18 a transmission talk digital voice signal inputted through the speech codec 6 with certain data added thereto.

The high frequency clock pulses CH outputted from the high frequency oscillator 44 are mainly used for operation of the CPU, generating the reception timing signal outputted to the demodulator 16, etc. while, on the other hand, the low frequency clock pulses CL outputted from the low frequency oscillator 46 are mainly used for performing time counting with respect to reception waiting time period when the CPU and the communication unit 30 are inhibited from receiving by executing intermittent reception.

Figure 1:
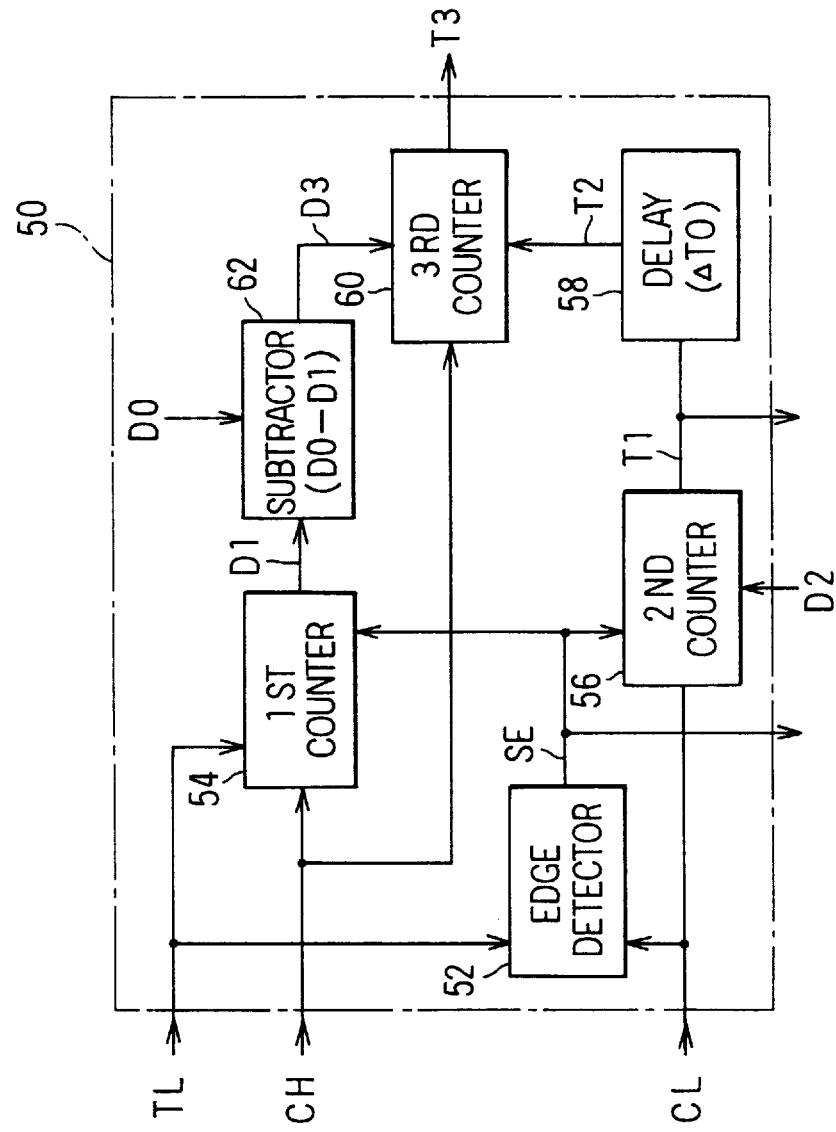
FIG. 1 is a block diagram illustrating the construction of a reception start timing setting circuit according to a preferred embodiment of the present invention.

Next, an explanation will be given of a reception start timing setting circuit 50 that is provided in the controller 42 in order to execute the above-mentioned intermittent reception as an intermittent reception control apparatus of this embodiment of the present invention, with reference to the block diagram illustrated in FIG. 1.

The reception start timing setting circuit 50 operates in response to a reception end trigger TL that is outputted from the CPU upon completion of reception of transmission data from the base station to the portable telephone. The high frequency clock pulses CH outputted from the high frequency oscillator 44 and the low frequency clock pulses CL outputted from the low frequency oscillator 46 along with the reception end trigger TL are inputted to the reception start timing setting circuit 50.

The reception start timing setting circuit 50 comprises an edge detecting circuit 52, a first counter 54, a second counter 56, a delay circuit 58, a third counter 60 and a subtractor 62. The edge detecting circuit 52 corresponding to the edge detecting means in the appended claims detects an initial rising edge of the low frequency clock pulses CL after inputting the reception end trigger TL. The first counter 54 corresponding to the first high frequency clock counting means in the appended claims starts its counting operation upon input of the reception end trigger TL and counts rising edges of the high frequency clock pulses CH and, when an edge detection signal SE is thereafter outputted from the edge detecting circuit 52, stops its counting operation and outputs a counted value D1 at that time. The second counter 56 corresponding to the low frequency clock counting means in the appended claims starts its counting operation upon receipt of the edge detection signal SE from the edge detecting circuit 52 and counts rising edges of the low frequency clock pulses CL inputted thereafter and, when the counted value thereof has reached a predetermined value D2, generates a timing signal T1. The delay circuit 58 corresponding to the delaying means in the appended claims delays the timing signal T1 from the second counter 56 by a predetermined time period ΔT0. The third counter 60 corresponding to the second high frequency clock counting means in the appended claims starts its counting operation upon receipt of a timing signal T2 delayed by the predetermined time period ΔT0 by the delay circuit 58 and counts rising edges of the high frequency clock pulses CH thereafter inputted thereto and, when the counted value thereof has reached a predetermined value D3, outputs a timing signal (reception start trigger) T3 representing an intermittent reception start timing. The subtractor 62 corresponding to the counted value setting means in the appended claims subtracts the counted value D1 of the first counter 54 from a preset reference counted value D0 upon output of the counted value D1 of the high frequency clock pulses CH from the first counter 54 to thereby set a counted value D3 for causing the third counter 60 to generate a reception start trigger T3.

The edge detection signal SE from the edge detecting circuit 52 is outputted to the high frequency oscillator 44 as a stop signal to stop the oscillation thereof and the timing signal T1 from the second counter 56 is outputted to the high frequency oscillator 44 as a start signal to re-start the oscillation thereof. As a result, the high frequency oscillator 44 stops or starts its oscillation according to these respective signals. That is, in this embodiment, the edge detecting circuit 52 and the second counter 56 are corresponding to the high frequency oscillator stopping means in the appended claims.

Meanwhile, the reference counted value D0 is intended to set the counted value D3 of the third counter 60 by use of the counted value D1 of the first counter 54 so that the total sum of respective counted time periods of the first counter 54, the second counter 56 and the third counter 60 and the time delay period ΔT0 of the delay circuit 58 is equal to a reception waiting time period TW which is predetermined according to the time-divisional transmission cyclic period on the base station. The counted value D3 is set as follows.

First, when one cyclic period of the high frequency clock pules CH is represented by ΔTH and one cyclic period of the low frequency clock pulses CL is represented by ΔTL, a counted time period ΔT1 of the first counter 54, a counted time period ΔT2 of the second counter 56 and a counted time period ΔT3 of the third counter 60 are described as ΔT1= ΔTH×D1, ΔT2=ΔTL×D2 and ΔT3=ΔTH×D3, respectively. Also, the reception waiting time period TW that after input of the reception end trigger TL lapses until the reception start trigger T3 is outputted can be described as in the following equation (1).

$$TW = \Delta T1 + \Delta T2 + \Delta T0 + \Delta T3 \qquad (1)$$

Since the time delay period ΔT0 of the delay circuit 58 and the counted time period ΔT2 of the second counter 56 are constant and the counted time period ΔT1 of the first counter 54 can be determined from the counted value D1 thereof, the counted value D3 for making the reception waiting time period TW constant can be derived as follows.

$$\begin{aligned}\Delta T3 &= TW - \Delta T1 - \Delta T2 - \Delta T0 \qquad (2)\\ &= Tx - \Delta T1 \text{ (where } Tx = TW - \Delta T2 - \Delta T0)\end{aligned}$$

$$\Delta TH \times D3 = Tx - \Delta TH \times D1$$

$$D3 = (Tx/\Delta TH) - D1$$

Therefore, in this embodiment, a predetermined constant value that corresponds to TX/ΔTH in the above equation (2) is set as the reference counted value D0 and, the subtractor 62 sets the counted value D3 of the third counter 60 by subtracting the counted value D1 of the first counter 54 from the reference counted value D0. Then, the reception waiting time period TW can be controlled as a constant time period.

As mentioned above, in the reception start timing setting circuit 50 of this embodiment, as illustrated in FIG. 3, upon input of the reception end trigger TL from the CPU, the time period ΔT1 that thereafter lapses until the low frequency clock pulses CL rises is counted by the first counter 54. When the low frequency clock pulses CL rises thereafter with the result that the edge detection signal SE is outputted from the edge detecting circuit 52, the edge detection signal SE stops the oscillating operation of the high frequency oscillator 44 and also starts the counting operation of the second counter 56. When the counted value with respect to the low frequency clock pulses CL reaches the predetermined value D2 and the predetermined time period ΔT2 lapses, the timing signal T1 is outputted from the second counter 56 and the timing signal T1 re-starts the oscillating operation of the high frequency oscillator 44. The timing signal T1 is delayed for the predetermined time delay period ΔT0 by the delay circuit 58 and is inputted to the third counter 60 as the timing signal T2 for starting the counting operation thereof. Then, the third counter 60 counts the high frequency clock pulses CH until the counted value thereof reaches the counted value D3 determined by the subtractor 62 as mentioned above. As a result, when the counted value thereof reaches the counted value D3 and the predetermined time period ΔT3 lapses, the third counter 60 outputs the reception start trigger T3.

The time delay period ΔT0 is for counting a time period until stable high frequency clock pulses CH are outputted from the high frequency oscillator 44 after the oscillating operation of the high frequency oscillator 44 is re-started by the timing signal T1. As a result of this, the third counter 60 can perform accurate time counting by use of the high frequency clock pulses CH from immediately after start of the counting operation thereof.

According to this embodiment, the reception waiting time period TW until the reception start trigger T3 is outputted to re-start the receiving operation on the CPU and the communication unit 30 after input of the reception end trigger TL from the CPU can be controlled with a very high accuracy with a time resolution determined by the cyclic period of the high frequency clock pulses CH outputted from the high frequency oscillator 44. In addition, the oscillation of the high frequency oscillator 44 is stopped by the time counting performed by counting the low frequency clock pulses CL during the majority of the reception waiting time period. Therefore, the current consumption of the high frequency oscillator 44 can be remarkably decreased compared to the case of making the oscillator 44 oscillate continuously, thereby enabling a decrease in the amount of power consumption of the entire portable telephone. For this reason, it becomes possible to suppress the amount of power consumption of the battery that is a power source of the portable phone and to achieve long use of the battery.

Meanwhile, since each of the counted values D0 and D1 is binary data whose maximum bit length is fixed, the subtractor 62 for performing the calculation of (D0–D1) as explained above usually consists of an adder and an inverter. For instance, the subtractor is constructed such that each bit of the counted value D1 is inverted by an inverter (e.g., using a Texas Instruments SN 74 LS 04). By adding this inverted data to the reference counted value D0 (in this case, the data obtained by adding 1 to Tx/ΔTH is used) by use of an adder (e.g., a Texas Instruments SN 74 LS 283), the calculation of (D0–D1) is performed.

The reference counted value D0 necessary for the calculating operation in the subtractor 62 and the counted value D2 used when the timing signal T1 is outputted from the second counter 56 are required to be predetermined, and it is preferable to provide registers (e.g., Texas Instruments SN 74 LS 373 ICs) into which the counted values D0 and D2 are writable at the subtractor 62 and the second counter 56 and to write the counted values D0 and D2 from the CPU into these registers when the reception end trigger TL is outputted.

A binary counter (e.g., a Texas Instruments SN 74 LS 161) may be used as the counters 54, 56 and 60. As the delay circuit 58, a delay circuit which is constructed such that delay elements each consisting of an inverter and the like are connected to each other and the input signal is outputted with a delay of a predetermined time period determined depending on the time delay period (the inverting operation time period) of the respective delay element and the total number of the connected delay elements may be used. Thus, the delay circuit 58 can be easily constructed.

Figure 4A:
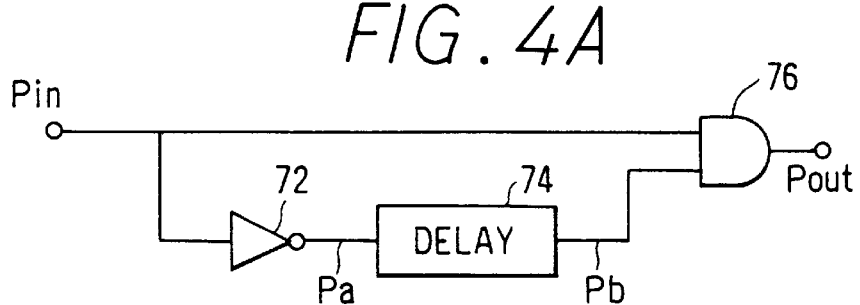
FIGS. 4A and 4B are views illustrating an example of the construction and operation, respectively, of an edge detecting circuit used in the embodiment.
Figure 4B:
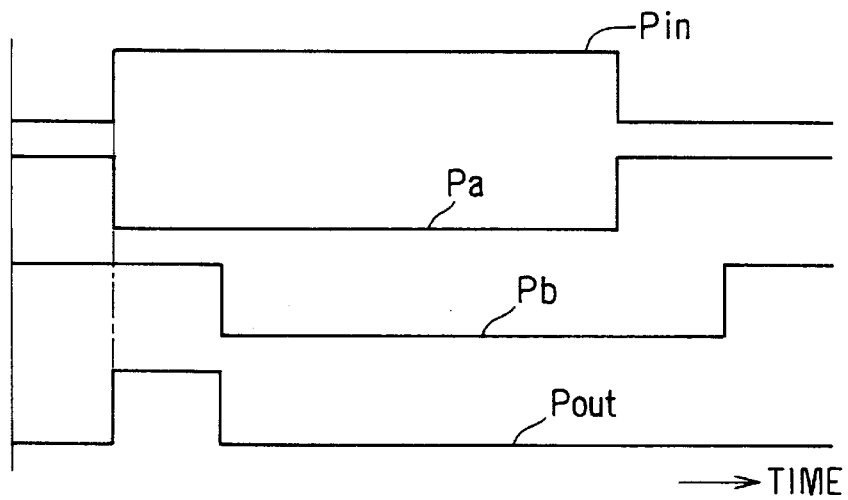
Figure 5:
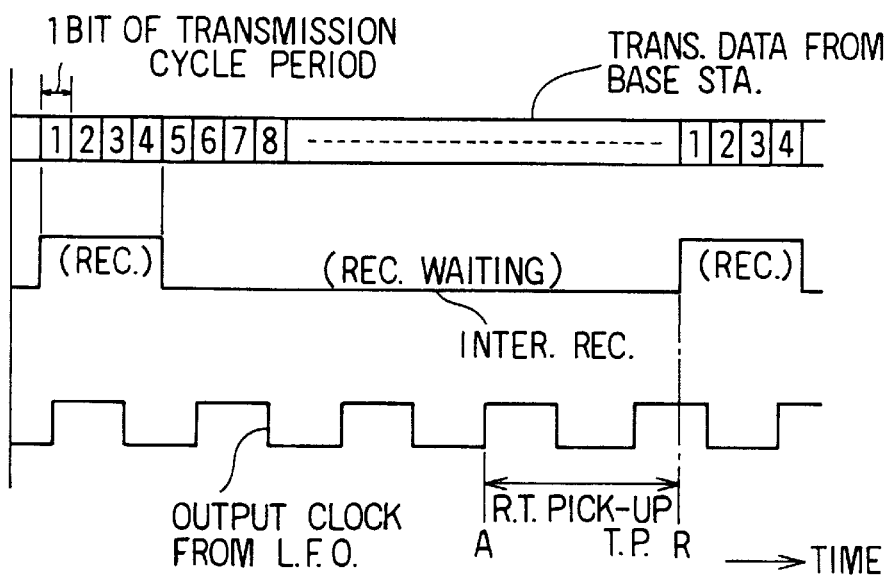
FIG. 5 is an explanatory view illustrating the problem that arises in the prior art when setting an intermittent reception start timing by using only a low frequency oscillator.

While the edge detecting circuit 52 is intended to be used for detecting rising edges of the low frequency clock pulses CL, this type of edge detecting circuit can be easily constructed, as illustrated in FIG. 4A, using an inverter 72 for inverting input signals, a second delay circuit 74 for delaying the output from the inverter 72 for a certain time period, and an AND circuit 76 for ANDing the output from the delay circuit 74 and the input signal. According to the edge detecting circuit constructed as described above, as shown in FIG. 4B, an input signal Pin is inverted in an inverter 72 and the inverted signal Pa is delayed by the second delay circuit 74 for a certain time period and inputted to the AND circuit 76. Therefore, a delay signal Pb thus produced is inverted to a low level signal after a certain time period has passed after the input signal Pin has risen. This signal Pb and the original signal Pin are provided to the AND circuit 76 and, as a result, a pulse signal Pout that after the input signal Pin has risen becomes a high level signal for only the predetermined time period determined by the time delay of the second delay circuit 74 is outputted from the AND circuit 76. Accordingly, if the low frequency clocks CL are inputted to the edge detecting circuit, it becomes possible to easily detect the rising edges thereof. Although one embodiment of the present invention has been described, the present invention is not limited to the above-mentioned embodiment but permits various changes and modifications to be made.

For instance, although the above-mentioned embodiment described a case of controlling an intermittent reception start timing when the portable telephone intermittently receives transmission data from the base station, the present invention is not limited to the portable telephone but can be applied to any apparatus if it intermittently receives transmission data transmitted periodically from the base station. In this case, similar effects can be obtained.

Furthermore, although the above-mentioned embodiment uses the rising edges when the low frequency clock pulses CL are detected in the edge detecting circuit 52 and also when counting the numbers of the high frequency clock pulses CH and low frequency clock pulses CL in the counters 54, 56 and 60, this detection of edges or counting the number of clock pulses may also be performed by using falling edges of respective signals.

Although the present invention has been fully described in connection with the preferred embodiments thereof with reference to accompanying drawings, it is to be noted that various changes and modifications will become apparent to those skilled in the art. Such changes and modifications are to be understood as being included within the scope of the present invention as defined by the appended claims.

What is claimed is:

1. An intermittent reception control apparatus, provided in a reception unit for intermittently receiving transmission data transmitted from a base station at a predetermined time period and for setting an intermittent reception timing, said apparatus comprising:

a high frequency oscillator for oscillating and outputting high frequency clock pulses in a cyclic period shorter than a transmission cyclic period for one bit of data of said base station;

a low frequency oscillator for oscillating and outputting low frequency clock pulses in a cyclic period longer than said transmission cyclic period for one bit of data of said base station;

edge detecting means for detecting an edge of said low frequency clock pulses outputted from said low frequency oscillator;

first high frequency clock counting means for counting a number of said high frequency clock pulses outputted from said high frequency oscillator after said reception unit comes to wait for said transmission data transmitted from said base station until an initial edge is detected by said edge detecting means;

low frequency clock counting means for counting a number of said low frequency clock pulses after said initial edge is detected by said edge detecting means and for generating a timing signal when said counted number of said low frequency clock pulses counted by said low frequency clock counting means reaches a predetermined number;

second high frequency clock counting means for counting a number of said high frequency clock pulses after said timing signal is outputted from said low frequency clock counting means and for generating an intermittent reception start timing signal when said counted number of said high frequency clock pulses counted by said second high frequency clock counting means reaches a predetermined number;

counted value setting means for setting said predetermined number of said high frequency clock pulses to be counted by said second high frequency clock counting means based on said number of said high frequency clock pulses counted by said first high frequency clock counting means and a preset number of clock pulses; and high frequency oscillator stopping means for stopping said oscillation of said high frequency oscillator while said low frequency clock counting means is counting said low frequency clock pulses.

2. An intermittent reception control apparatus according to claim 1, wherein:

said second high frequency clock counting means includes delaying means for delaying said timing signal generated by said low frequency clock counting means for a predetermined time period and starts counting of said high frequency clock pulses according to said timing signal delayed by said delaying means; and said high frequency oscillator stopping means is further for stopping said oscillation of said high frequency oscillator when said initial edge is detected by said edge detecting means and for re-starting said oscillation of said high frequency oscillator when said timing signal is thereafter outputted from said low frequency clock counting means.

3. An intermittent reception control apparatus according to claim 1, wherein said counted value setting means is for setting the predetermined number of said high frequency clock pulses to be counted by said second high frequency clock counting means based on said preset number of clock pulses, preset by a counted time period of said low frequency clock counting means and a reception waiting time period, and said number of said high frequency clock pulses.

4. An intermittent reception control apparatus, provided in a reception unit for intermittently receiving transmission data transmitted from a base station at a predetermined time period and for setting an intermittent reception timing, said apparatus comprising:

a high frequency oscillator for oscillating and outputting high frequency clock pulses in a cyclic period shorter than a transmission cyclic period for one bit of data on said base station;

a low frequency oscillator for oscillating and outputting low frequency clock pulses in a cyclic period longer than said transmission cyclic period for one bit of data of said base station;

high frequency clock counting means for counting a number of said high frequency clock pulses outputted from said high frequency oscillator;

low frequency clock counting means for counting a number of said low frequency clock pulses outputted from said low frequency oscillator; and intermittent reception control means for counting said intermittent reception timing by using said high frequency clock counting means and said low frequency clock counting means and for stopping said oscillation of said high frequency oscillator while said low frequency clock counting means is counting said number of said low frequency clock pulses outputted from said low frequency oscillator.

5. An intermittent reception control apparatus according to claim 4, wherein said intermittent reception control means includes determination means for determining a time period to stop said oscillation of said high frequency oscillator based on said number of said low frequency clock pulses counted by said low frequency clock counting means, and oscillation switching means for switching said oscillation of said high frequency oscillator based on said time period determined by said determination means.

6. An intermittent reception control apparatus according to claim 5, wherein said intermittent reception control means includes a delaying means for delaying its start of counting of said high frequency clock pulses by said high frequency clock counting means.

7. An intermittent reception control apparatus, provided in a reception unit for intermittently receiving transmission data transmitted from a base station at a predetermined time period, for setting a timing to re-start said intermittent reception after said intermittent reception is stopped, said apparatus comprising:

a high frequency oscillator for oscillating and outputting high frequency clock pulses in a cyclic period shorter than a transmission cyclic period for one bit of data of said base station;

a low frequency oscillator for oscillating and outputting low frequency clock pulses in a cyclic period longer than said transmission cyclic period for one bit of data of said base station;

edge detecting means for detecting an edge of said low frequency clock pulses outputted from said low frequency oscillator;

first high frequency clock counting means for counting a number of said high frequency clock pulses outputted from said high frequency oscillator after said reception unit comes to wait for said transmission data transmitted from said base station until an initial edge is detected by said edge detecting means;

low frequency clock counting means for counting a number of said low frequency clock pulses after said initial edge is detected by said edge detecting means and for generating a timing signal when said counted number of said low frequency clock pulses counted by said low frequency clock counting means reaches a predetermined number;

second high frequency clock counting means for counting a number of said high frequency clock pulses after said timing signal is outputted from said low frequency clock counting means and for generating an intermittent reception start timing signal when said counted number of said high frequency clock pulses counted by said second high frequency clock counting means reaches a predetermined number; and high frequency oscillator stopping means for stopping said oscillation of said high frequency oscillator while said low frequency clock counting means is counting said low frequency clock pulses.

8. An intermittent reception control apparatus according to claim 7, wherein said second high frequency clock counting means includes a delaying means for delaying said timing signal generated by said low frequency clock counting means for a predetermined time period and starts counting of said high frequency clock pulses according to said timing signal delayed by said delaying means.

9. An intermittent reception control apparatus according to claim 8, wherein said high frequency oscillator stopping means stops said oscillation of said high frequency oscillator when said initial edge is detected by said edge detecting means and re-starts said oscillation of said high frequency oscillator when said timing signal is thereafter outputted from said low frequency clock counting means.

10. An intermittent reception control method for intermittently receiving transmission data transmitted from a base station at a predetermined time period and for setting an intermittent reception timing, comprising steps of:

counting pulses of a first clock signal during a portion of said intermittent reception timing;

counting pulses of a second clock signal during a remaining portion of said intermittent reception timing, said second clock signal having a frequency higher than a frequency of said first clock signal; and prohibiting outputs of said second clock signal while said intermittent reception timing is counted using said first clock signal.

11. An intermittent reception control method according to claim 10, wherein:
   a frequency of said first clock signal is lower than a frequency of said transmission data transmitted from said base station; and
   a frequency of said second clock signal is higher than said frequency of said transmission data transmitted from said base station.

12. An intermittent reception control method according to claim 11, further comprising a step of:
   generating a timing signal when said step of counting by said first clock signal reaches a predetermined value which corresponds to said portion; wherein said step of counting by said second clock signal is started when said timing signal is generated.

13. An intermittent reception control method according to claim 12, further comprising a step of calculating a time period of said remaining portion based on said predetermined value and said predetermined time period.

14. An intermittent reception control method according to claim 13, further comprising a step of delaying performance of said step of counting by said second clock signal when said timing signal is generated.

15. An intermittent reception control method according to claim 12, further comprising a step of delaying performance of said step of counting by said second clock signal when said timing signal is generated.

* * * * *